United States Patent [19]

Ito et al.

[11] 4,422,168
[45] Dec. 20, 1983

[54] METHOD AND APPARATUS FOR DETECTING A FOCUSSING CONDITION OF AN OBJECTIVE LENS

[75] Inventors: Kenichi Ito; Tohru Musha; Kiichi Kato, all of Hachioji, Japan

[73] Assignee: Olympus Optical Co. Ltd., Japan

[21] Appl. No.: 292,929

[22] Filed: Aug. 14, 1981

[30] Foreign Application Priority Data

Aug. 19, 1980 [JP] Japan ................... 55-114464

[51] Int. Cl.³ ..................... G01J 1/36; G11B 7/00
[52] U.S. Cl. ......................... 369/45; 250/204
[58] Field of Search .......... 369/44, 45, 46, 109, 369/111; 358/227, 348, 347, 342; 356/123; 350/46; 250/204; 354/25

[56] References Cited

U.S. PATENT DOCUMENTS

4,123,652 10/1978 Bouwhuis .................. 369/45 X
4,296,316 10/1981 Tsuji et al. ................. 369/45 X
4,357,533 11/1982 Winslow .................... 369/45 X
4,358,200 11/1982 Heemskerk et al. ........ 369/45 X

*Primary Examiner*—Robert L. Richardson
*Attorney, Agent, or Firm*—Parkhurst & Oliff

[57] ABSTRACT

A method and apparatus for detecting a focussing error signal of an objective lens with respect to a video disc on which a light beam emitted from a laser light source is to be focussed as a light spot by the objective lens. A light flux reflected by the video disc is made incident upon a detection prism surface which is set substantially at a critical angle with respect to peripheral light fluxes reflected by the video disc, and the peripheral light fluxes reflected by the reflection surface are separately received by two light receiving regions which are spaced apart from each other. The focussing error signal is derived as a difference between output signals from the two light receiving regions.

58 Claims, 20 Drawing Figures

FIG_10

FIG_11A

FIG_11B

METHOD AND APPARATUS FOR DETECTING A FOCUSSING CONDITION OF AN OBJECTIVE LENS

BACKGROUND OF THE INVENTION

The present invention relates to a method for detecting a focussing condition of an objective lens with respect to an object on which a light spot has to be focussed by said objective lens and to an apparatus for carrying out such a focus detecting method.

Such focus detecting method and apparatus are advantageously applied to an apparatus in which a scanning light spot is projected by an objective lens onto one or more information tracks recorded spirally or concentrically on a disc-shaped record medium to read an information recorded along the track.

In an embodiment of the apparatus for reproducing or picking-up an information from the above mentioned record medium, the record medium is called as a video disc in which encoded video and audio signals are recorded as optical information utilizing optical transmitting, reflection and phase properties. While the video disc is rotated at a high speed such as thirty revolutions per second, i.e. 1,800 rpm, a laser beam emitted from a laser light source such as a helium-neon gas laser is focussed on the track of the disc as a light spot and the optical information is read out therefrom. One of important properties of such a record medium is a very high density of recorded information and thus a width of the information track is very narrow and a space between successive tracks is also very narrow. In a typical video disc, a pitch of the tracks amounts only to 2 $\mu$m. Therefore, the diameter of light spot should be correspondingly small such as 1 to 2 $\mu$m. In order to pick-up correctly the recorded information from such tracks having very narrow width and pitch, an error in a distance between the objective lens and the tracks, i.e. a focussing error, should be reduced as little as possible to make a spot diameter as small as possible.

To this end, the apparatus is provided with a focussing control system in which an amount and a direction of a de-focussed condition of the objective lens with respect to the disc surface are detected to produce a focussing error signal and the objective lens is moved in a direction of the optical axis of objective lens in accordance with the detected focussing error signal.

Figure 1:
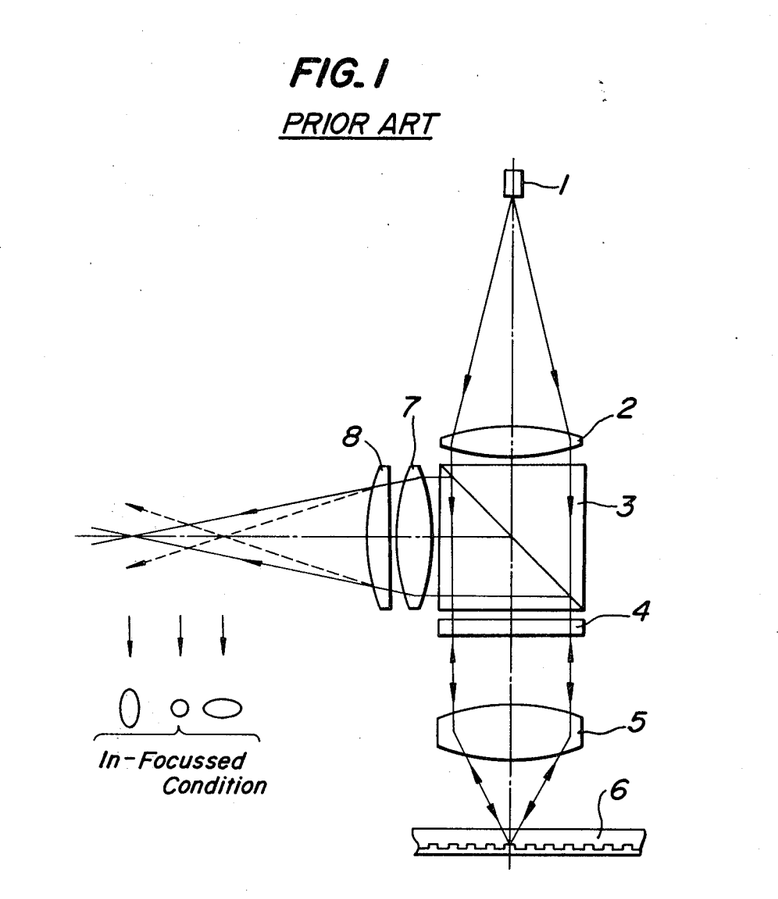
FIG. 1 is a schematic view illustrating an optical system of an optical pick-up apparatus with a known focus detection system.

FIG. 1 is a schematic view illustrating a known focus detection system in an optical pick-up apparatus. A light source 1 is constituted by a laser and emits light which is linearly polarized in a plane of the drawing of FIG. 1. The light is collimated by a collimator lens 2 into a parallel light beam which is then transmitted through a polarizing prism 3 and a quarter-wavelength plate 4. The light beam is further focussed by an objective lens 5 as a light spot on a disc 6 having one or more information tracks of crenellated pit construction. Then, the light is reflected by the information track and impinges upon the polarizing prism 3 by means of the objective lens 5 and the quarter-wavelength plate 4. The light impinging on the prism 3 is polarized in a direction perpendicular to the plane of the drawing, because it has transmitted through the quarter-wavelength plate 4 twice and thus, is now reflected by the polarizing prism 3. The light flux reflected by the polarizing prism 3 is converged by a condenser lens 7 and a cylindrical lens 8. Since the cylindrical lens 8 has a focussing power only in one direction, the shape of the focussed beam formed by the condenser lens 7 and the cylindrical lens 8 varies as shown in FIG. 1 with respect to an in-focussed condition in mutually orthogonal directions, when the disc 6 moves up and down. In the known apparatus, this variation in shape is detected by a light detector (not shown) divided into four sections and arranged at a focal plane of the lens system 7, 8 to produce a focussing error signal. The focussing error signal thus detected is supplied to a focussing mechanism such as a moving coil mechanism to move the objective lens 5 in its axial direction.

In the known focus detecting system, since a relatively long optical path is required to focus the light beam after being reflected by the polarizing prism 3, there is a drawback that an optical system is liable to be large in size. Further, since the light detector having the four sections must be arranged precisely in three axial directions, i.e. in the optical axis direction and in two orthogonal directions perpendicular to the optical axis, the adjustment in positioning the light detector is quite critical and requires a time-consuming work. Moreover, since a dynamic range in which the accurate focussing error signal can be obtained due to the deformation of the focussed beam is relatively small, any focussing error signal could not be produced if the disc deviates from a given position only by a relatively small distance.

The applicant has proposed a method which can obviate the above mentioned drawbacks and can detect a focussing error signal of an objective lens with respect to an object onto which a light spot is to be focussed, which method has an extremely high sensitivity for focus detection.

According to this method, in order to detect a focussing error signal of an objective lens with respect to an object on which a light spot is to be formed by means of said object lens, the following steps are carried out; focussing light emitted from a light source onto the object; introducing at least a part of a light flux reflected from the object into an optical member including an optical surface which reflects and/or refracts said part of light flux, said optical member being made of material which has a higher refractive index than that of material into which said light flux enters after being refracted by and transmitted through said optical surface; and detecting a variation in distribution of light amount of at least a part of light flux reflected and/or refracted by said optical surface to produce the focussing error signal.

Figure 2:
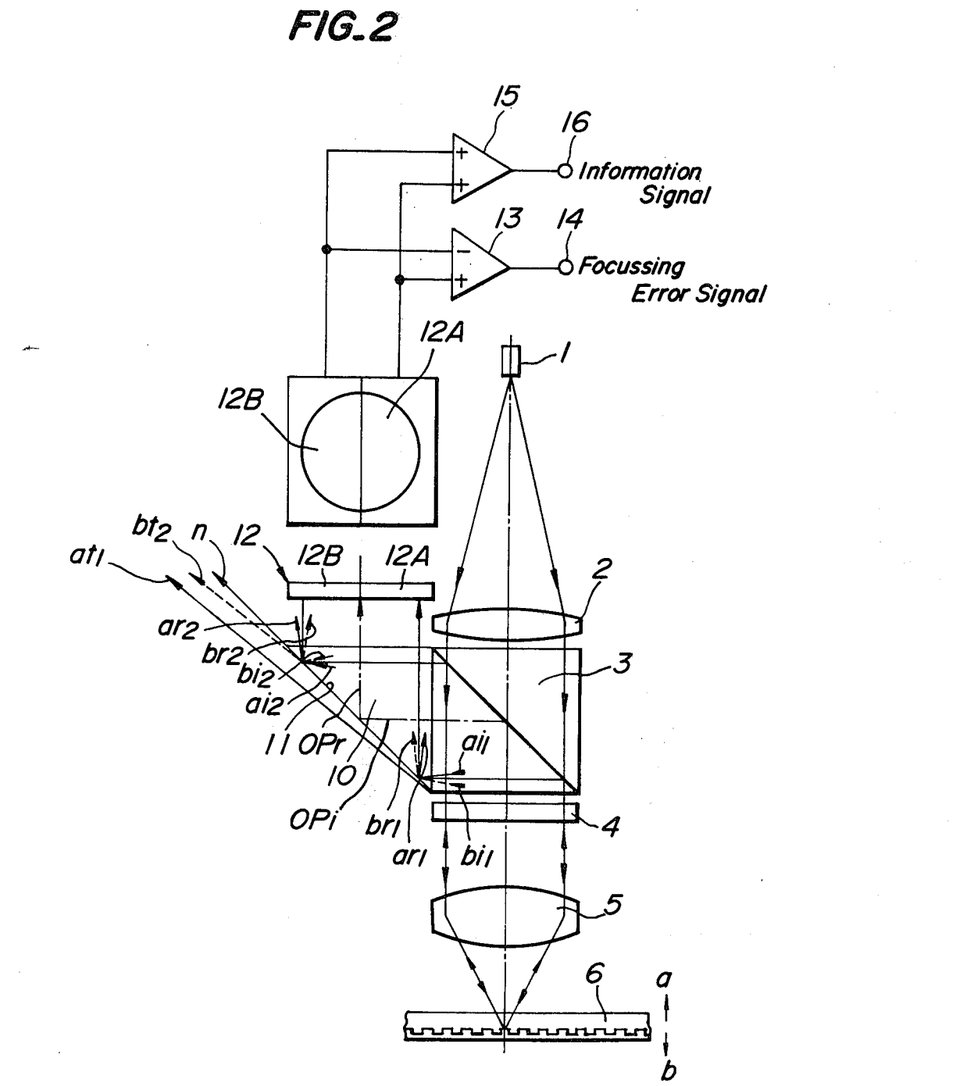
FIG. 2 is a schematic view showing an embodiment of a focus detection apparatus proposed by the applicant.

FIG. 2 is a schematic view illustrating an optical pick-up apparatus for effecting the above mentioned focus detection method proposed by the applicant. In this method, an optical system for projecting a scanning light spot onto a record medium is same as that shown in FIG. 1. A linearly polarized light beam emitted from a laser light source 1 is collimated into a parallel light beam by a collimator lens 2 and passes through a polarizing prism 3 and a quarter-wavelength plate 4. Then, the parallel light beam impinges upon an objective lens 5 and is focussed on an information track of a disc 6 as a small light spot. The light beam reflected by the disc 6 is optically modulated in accordance with information recorded in the track and is reflected by the polarizing prism 3. The construction and operation of the optical system so far explained are entirely same as those of the known optical system shown in FIG. 1. The light flux reflected by the polarization prism 3 impinges upon a detection prism 10 having a reflection surface 11 and the light flux reflected by this surface 11 is received by a light detector 12. The reflection surface 11 is so arranged with respect to the incident light that under an in-focussed condition it makes a given angle with respect to the incident light (parallel light flux) which angle is equal to a critical angle or slightly smaller or greater than the critical angle. For a more detailed discussion concerning the reflection and refraction of light, reference is had to Fundementals of Physics, by Halliday and Resnick, published by John Wiley and Sons Inc. (chapter 36). Now, for the time being, it is assumed that the reflection surface 11 is set at the critical angle. In the in-focussed condition, the whole light flux reflected by the polarizing prism 3 is totally reflected by the reflection surface 11. In practice, a small amount of light is transmitted into a direction n shown in FIG. 2 due to incompleteness of a surface condition of the reflection surface 11. However, such a small amount of transmitted light may be ignored. If the disc 6 deviates from the in-focussed condition in a direction a in FIG. 2 and a distance between the objective lens 5 and the disc 6 is shortened, the light reflected by the polarizing prism 3 is no longer the parallel beam, but changes into a diverging light beam including extreme light rays $ai_1$ and $ai_2$. On the contrary, if the disc 6 deviates in the opposite direction b, the parallel light beam is changed into a converging light beam including extreme light rays $bi_1$ and $bi_2$. As can be seen in FIG. 2, light rays from an incident optical axis $OP_i$ to the extreme light ray $a_{i1}$ have incident angles smaller than the critical angle and thus, are transmitted through the reflection surface 11 at least partially. Contrary to this, light rays between the optical axis $OP_i$ and the extreme light ray $ai_2$ have incident angles larger than the critical angle and thus are totally reflected by the surface 11. In case of deviation of the disc 6 in the direction b, the above relation becomes inversed, and light rays below a plane which includes the incident optical axis $OP_i$ and is perpendicular to the plane of the drawing of FIG. 2, i.e. a plane of incidence, are totally reflected by the reflection surface 11, and light rays above said plane are at least partially transmitted through the reflection surface 11. As explained above, if the disc 6 deviates from the in-focussed position, the incident angles of the light rays impinging upon the reflection surface 11 vary in a continuous manner about the critical angle except for the center light ray passing along the optical axis $OP_i$. Therefore, when the disc 6 deviates from the in-focussed position either in the direction a or b, the intensity of the light reflected by the reflection surface 11 varies abruptly near the critical angle in accordance with the above mentioned variation in the incident angles. In this case, senses of the variations of the light intensities on both sides of said plane perpendicular to the incident plane and including the incident optical axis $OP_i$ vary in mutually opposite manner. On the contrary, in the in-focussed condition, the light flux impinging upon the detection prism 10 is totally reflected by the reflection surface 11 and thus, the uniform light flux impinges upon the light detector 12. The light detector 12 is so constructed that the lower and upper light fluxes with respect to said plane are separately received by separate regions 12A and 12B, respectively. That is to say, the light detector 12 is divided along a plane which is perpendicular to the incident plane and includes an optical axis $OP_r$ of reflected light.

Figure 3:
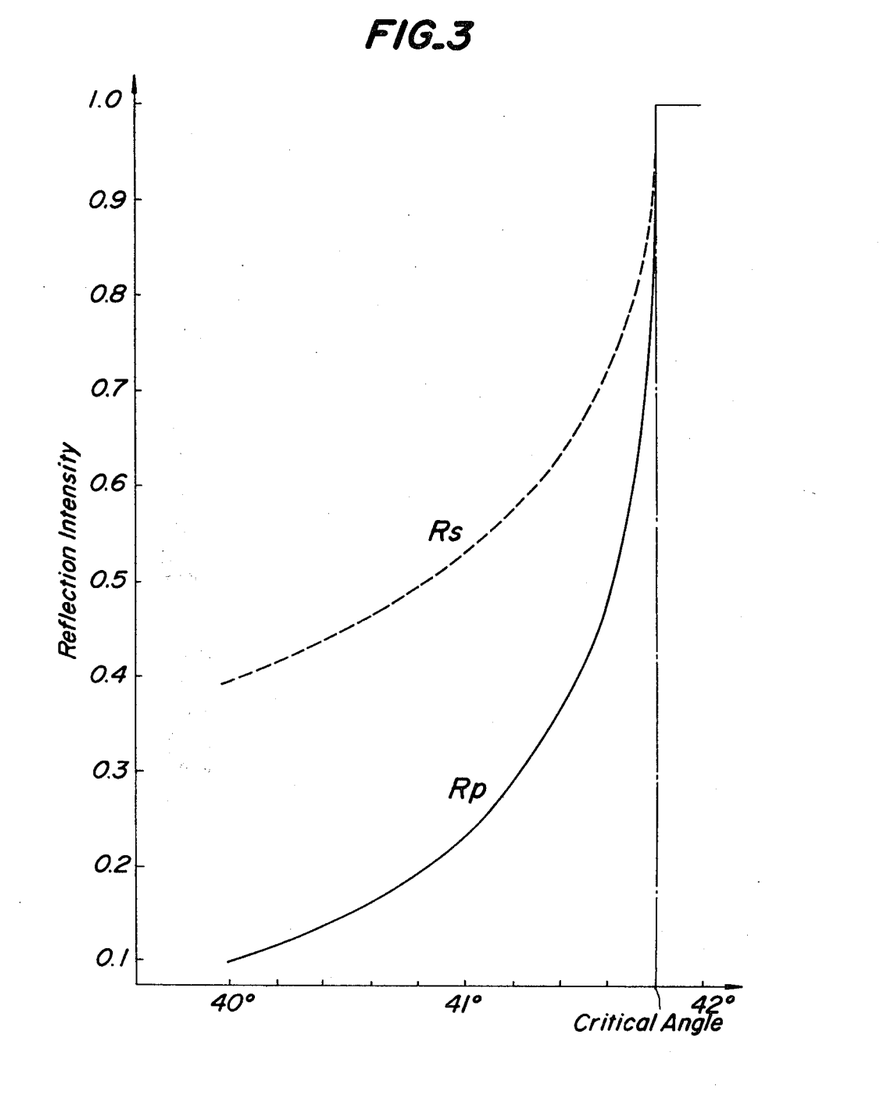
FIG. 3 is a graph showing an intensity of reflected light having an incident angle near a critical angle.

FIG. 3 shows a graph representing a variation of an intensity of reflected light in accordance with an incident angle near the critical angle. Curves $R_p$ and $R_s$ indicate the light intensities for P and S polarized light rays, respectively. The curves are obtained when the detection prism 10 is made of material having a refractive index of 1.50. It should be noted that an intensity of a non-polarized light ray is equal to an intermediate value of $R_p + R_s/2$.

In FIG. 2, if the disc 6 deviates in the direction a, the light rays of the lower half of the incident light flux have incident angles smaller than the critical angle. Therefore, at least a part of the lower half light flux is transmitted through the reflection surface 11 and the amount of light impinging upon the light receiving region 12A is decreased. While the upper half of the incident light flux has the incident angles larger than the critical angle and thus, is totally reflected by the surface 11. Therefore, the amount of light impinging upon the light receiving region 12B is not changed. On the contrary, if the disc 6 deviates in the direction b, the amount of light impinging upon the region 12B is decreased, but the amount of light impinging upon the region 12A is not changed. In this manner, the output signals from the regions 12A and 12B vary in an opposite manner. A focussing error signal can be obtained at an output 14 of a differential amplifier 13 as a difference signal of these signals from the regions 12A and 12B.

The reflection surface 11 may be set at an angle slightly smaller than the critical angle. In such a case when the disc 6 deviates in the direction a, the amount of light impinging upon the region 12B is first increased and then becomes constant and the amount of light impinging upon the region 12A is decreased abruptly. Whereas, if the disc 6 deviates in the direction b, the amount of light impinging upon the region 12A is first increased and then becomes constant, while the amount of light impinging upon the region 12B is decreased abruptly.

In this manner by detecting a difference in output signals from the light receiving regions 12A and 12B, it is possible to obtain the focussing error signal having an amplitude which is proportional to an amount of the deviation from the in-focussed condition and a polarity which represents a direction of the deviation with respect to the in-focussed condition. The focussing error signal thus obtained is used to effect a focussing control for driving the objective lens 5 in the direction of its optical axis. Further, it is possible to derive an information signal corresponding to the pit information recorded in the information track at an output 16 of an adder 15 which produces a sum signal of the output signals from the regions 12A and 12B. Further, in the in-focussed condition, since the light is scarcely transmitted through the reflection surface 11, a loss of light is very small and in the defocussed condition the half of light flux with respect to the central light ray is totally reflected, but an amount of the other half of light flux reflected by the surface 11 is decreased to a great extent, the difference in the amount of light impinging upon the regions 12A and 12B becomes great. Therefore, the very accurate focus detection can be effected with a very high sensitivity.

For instance, when use is made of the objective lens 5 having a numerical aperture NA=0.5 and a focal length f=3 mm and of the detection prism 10 having a refractive index n=1.50 and the disc 6 deviates by about 1 $\mu$m, a variation of an incident angle for the extreme right ray which is subjected to the largest variation in incident angle is about 0.015° which can cause a sufficiently large variation in light amount impinging upon the detector regions 12A and 12B.

In the apparatus shown in FIG. 2, the two light receiving regions 12A and 12B of the light detector 12 receive the light flux reflected by the reflection surface 11. It is also possible to arrange the two light receiving regions so as to receive the light flux transmitted through the reflection surface 11 or to arrange the two regions so to as receive the light fluxes reflected by and transmitted through the reflection surface, respectively.

The above mentioned focussing error signal detecting apparatus is based on the fact that the incident angle of light ray impinging upon the reflection surface varies when the disc deviates out of the in-focussed position. However, at a central region including the optical axis, the incident angle changes only slightly, whereas at a peripheral region the incident angle varies greatly. Therefore, the variation in intensity of the light impinging upon the light detector becomes smaller at the central region as compared with that at the peripheral region.

In the optically picking-up apparatus there is also produced a so-called tracking error due to a relative shift between the beam spot and the information track. When the tracking error occurs, the amount of light reflected by the disc 6 is also varied and this variation is detected by the light receiving regions. Therefore, noise might be introduced in the focussing error signal and thus, a signal-to-noise ratio of the focussing error signal might be decreased. Particularly, in the central region of the reflected light flux, information about the focussing error is inherently small and thus the influence of the tracking error upon the focus detection will be relatively enhanced. Therefore, the accuracy of the focussing error detection will be decreased to a great extent. Further, since the information recorded in the disc 6 is also reproduced by the light detector 12, the reproduced information signal might be subjected to noise due to the focussing error and a signal-to-noise ratio might be reduced owing to the focussing error.

SUMMARY OF THE INVENTION

The present invention has for its object to provide a novel and useful focussing error signal detecting method which can attain the advantages of the method based on the total reflection due to the critical angle can obviate the above drawback and can obtain the focussing error signal without noise under a very high sensitivity.

According to the invention, a method for detecting a focussing error signal of an objective lens with respect to an object on which a light spot is to be formed by means of said objective lens comprises: focussing light emitted from a light source onto the object; introducing at least a part of a light flux reflected from the object into an optical member including an optical surface which reflects and/or refracts said part of light flux, said optical member being made of material which has a higher refractive index than that of material into which said light flux enters after being refracted by and transmitted through said optical surface; and detecting a variation in distribution of light amount of at least a part of peripheral light flux reflected and/or refracted by said optical surface to produce the focussing error signal.

It is another object of the invention to provide an apparatus for detecting a focussing error signal of an objective lens with respect to an object onto which a light spot is to be focussed by means of the objective lens, which apparatus can detect the focussing error signal at a very high sensitivity without being subjected to noise and can be made small in size and light in weight.

It is still another object of the invention to provide an apparatus for detecting a focussing error signal, in which a light detector can be easily arranged in position without troublesome adjustment and alignment.

According to the invention, an apparatus for detecting a focussing error signal of an objective lens with respect to an object onto which a light beam emitted from a light source is to be focussed as a light spot by means of said objective lens comprises: a beam splitting element arranged between the light source and the objective lens for directing the light beam emitted from the light source to the objective lens and directing a light flux reflected by the object into a direction different from that to the light source; an optical member arranged to receive at least a part of the light flux reflected from said object and including an optical surface which reflects and/or refracts said part of light flux, said optical member being made of material which has a higher refractive index than that of material into which the light flux enters after being refracted by and transmitted through said optical surface; light detecting means having at least two light receiving regions arranged to receive at least a part of said peripheral light flux reflected and/or refracted by said optical surface to produce output signals representing amounts of light impinging upon the light receiving regions; and a circuit for receiving the output signals from the light detecting means to form a difference signal as the focussing error signal.

BRIEF DESCRIPTION OF THE DRAWINGS

FIGS. 12, 13, 14, consisting of A and B, 15, 16 and 17 are schematic views depicting modified embodiments of the focus detection apparatus according to the invention.

DESCRIPTION OF THE PREFERRED EMBODIMENTS

Figures 4, 5A, 5B:
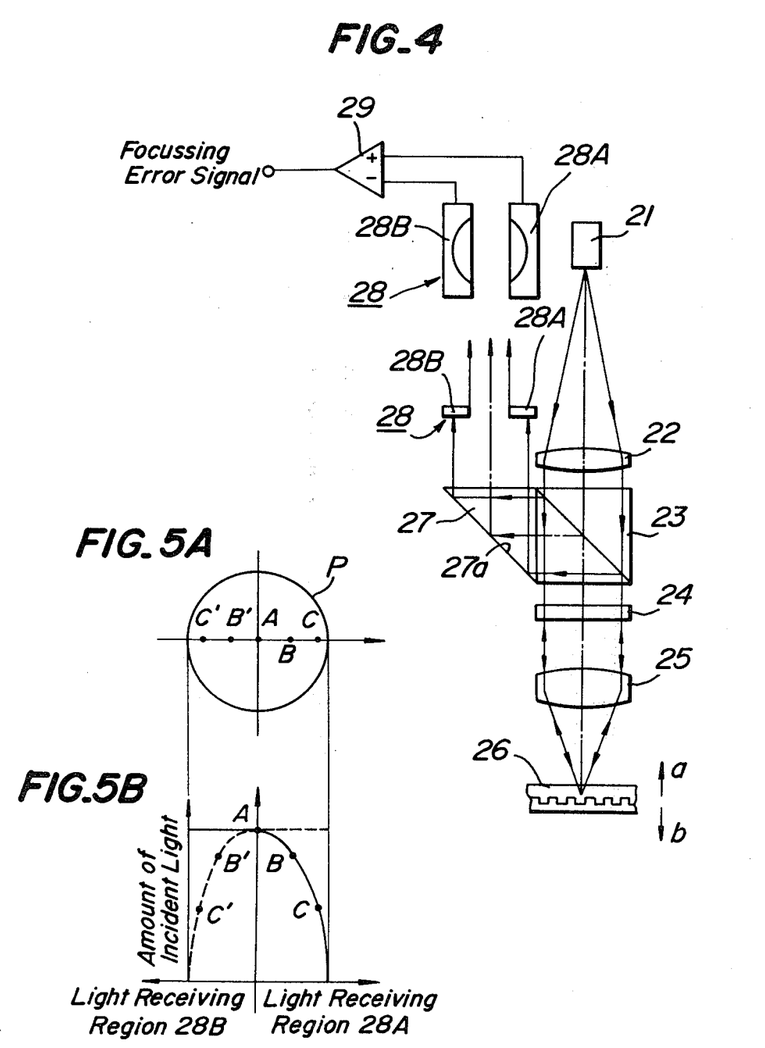
FIG. 4 is a schematic view illustrating an embodiment of the focussing error signal detecting apparatus according to the invention.
FIGS. 5A and 5B are schematic views illustrating an operation of the apparatus shown in FIG. 4.

FIG. 4 is a schematic view illustrating an embodiment of the focussing error signal detecting apparatus according to the invention. A P polarized beam emitted from a laser light source 21 is converted by a collimator lens 22 to a parallel light beam. The parallel light beam is projected by means of a polarizing prism 23, a quarter-wavelength plate 24 and an objective lens 25 onto a video disc 26 as a small light spot. The light reflected by the disc 26 is collected by the objective lens 25 and is converted into the S polarized light by means of the quarter-wavelength plate 24. The S polarized light is reflected by the polarizing prism 23 and is made incident upon a detection prism 27. The prism 27 has a reflection surface 27a which is set substantially at a critical angle for a parallel light flux in an in-focussed condition. According to the present embodiment, a light detector 28 has two separate light receiving regions 28A and 28B which are spaced apart from one another so as to receive light fluxes at a peripheral region. As explained above with reference to FIG. 2, a focussing error signal is obtained by a differential amplifier 29 as a difference between the outputs from the two light receiving regions 28A and 28B.

Now it is assumed that the reflection surface 27a is set just at the critical angle for the parallel light flux in the in-focussed condition. FIG. 5A shows a beam spot P impinging upon the reflection surface 27a in the in-focussed condition. FIG. 5B shows a variation in an amount of the reflected light flux at positions A, B, B', C and C' when the disc 26 deviates out of the in-focussed condition. A solid curve in FIG. 5B denotes the variation of the light fluxes incident upon the light receiving regions 28A and 28B when the disc 26 deviates in the direction a and a broken curve represents the variation is incident light when the disc deviates in the direction b. As apparent from FIG. 5B, at the position A on the optical axis, the incident light does not change even if the disc 26 deviates in either direction a or b, but remains constant. Contrary to this, at the points B and B' which is spaced apart, from the optical axis, the light amount is decreased to some extent in accordance with the deviation of the disc, and at the points C and C' which are further spaced far from the optical axis the light amount is decreased to a great extent. The invention is based on such a fact and the focussing error detection can be effected at very high sensitivity and accuracy by selectively receiving the light flux at the peripheral region by means of the separate light receiving regions 28A and 28B.

Figure 6:
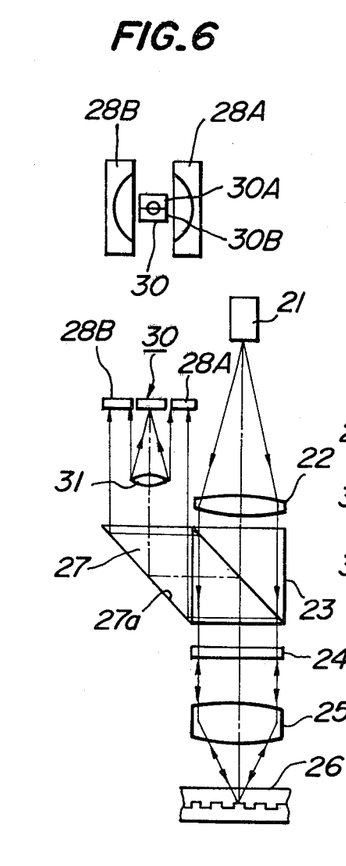
FIG. 6 is a schematic view depicting a modified embodiment of the focussing error signal detecting apparatus according to the invention.

FIG. 6 is a schematic view showing another embodiment of the focus detection apparatus according to the invention. In the present embodiment the focussing error signal can be obtained in entirely same manner as that of the previous embodiment shown in FIG. 4. That is to say, the peripheral light fluxes reflected by the reflection surface 27A are separately received by the two light receiving regions 28A and 28B which are opposed to each other with respect to the optical axis. In the present embodiment a condenser lens 31 is arranged on the optical axis to collect the central light flux about the optical axis and a second light detector 30 having two light receiving regions 30A and 30B is arranged at a focal plane of the condenser lens 31. The two regions 30A and 30B are divided along a plane which passed through the optical axis and is tangential to the information track of the disc 26. In such a construction, a tracking error signal can be derived from outputs of the regions 30A and 30B.

Figure 7:
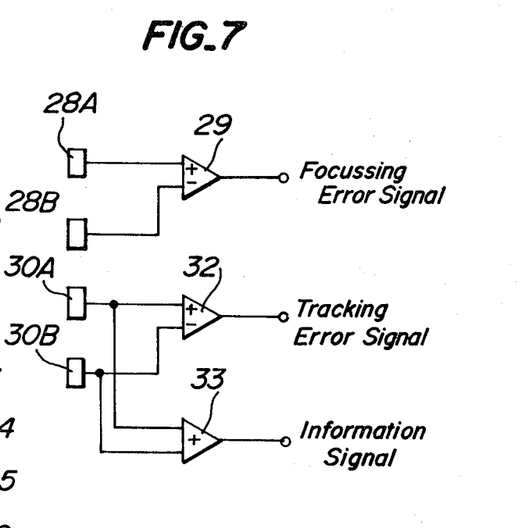
FIG. 7 is a circuit diagram showing a signal processing circuit of the apparatus shown in FIG. 6.

FIG. 7 is a circuit diagram showing an embodiment of a circuit for processing the outputs from the light detectors 28 and 30. In this embodiment, focussing error signal can be obtained from the first differential amplifier 29 as a difference between the outputs from the two light receiving regions 28A and 28B of the first light detector 28. The tracking error signal can be derived from a second differential amplifier 32 for producing a difference between the two light receiving regions 30A and 30B of the second light detector 30. Further by providing an adder 33 for forming a sum of the outputs from the light receiving regions 30A and 30B, an information signal can be obtained. As apparent from FIG. 6, the peripheral light is made incident upon the first light detector 28 and thus, there can be obtained the focussing error signal which is hardly affected by the tracking error. Moreover, since the second light detector 30 receives exclusively the central light, it is possible to obtain the tracking error signal and the information signal which are hardly influenced by the focussing error.

Figures 8, 9:
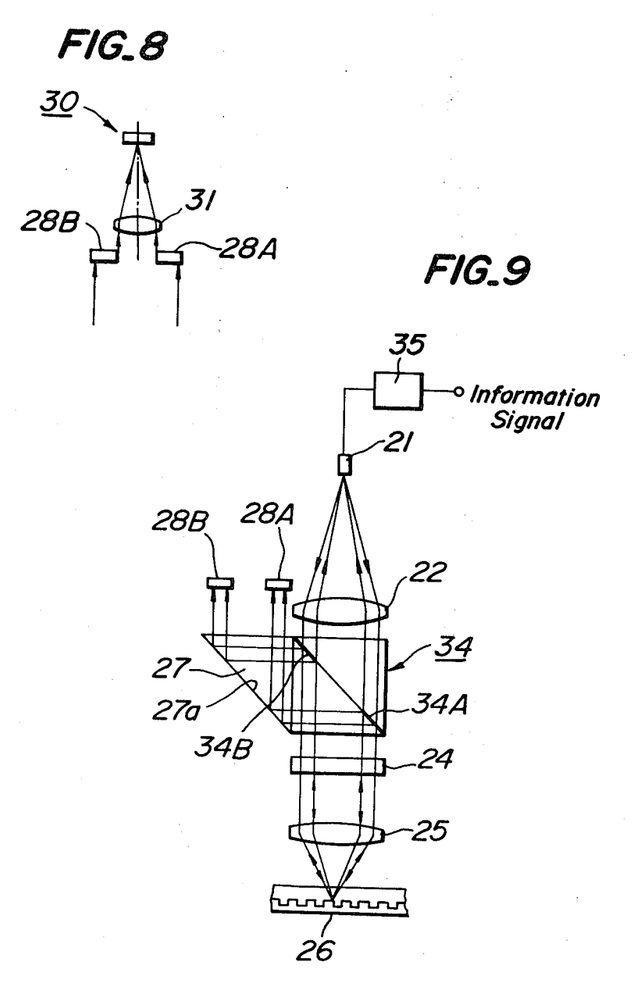
FIGS. 8, 9 and 10 are schematic views illustrating other embodiments of the focussing error signal detecting apparatus according to the invention.

FIG. 8 is a schematic view illustrating a modification of the embodiment shown in FIG. 6. In the embodiment in FIG. 6, the first and second light detectors 28 and 30 are arranged in the same plane, whereas in the embodiment shown in FIG. 8, the condenser lens 31 and the second light detector 30 are arranged behind the first light detector 28.

FIG. 9 shows still another embodiment of the focus error detecting apparatus according to the invention. In this embodiment, use is made of a polarizing prism 34 which has separate polarizing films 34A and 34B located at peripheral region. Therefore, only the peripheral light fluxes are reflected by the polarizing films towards the reflection surface 27a. The light fluxes reflected by the surface 27a are received by the two separate light receiving regions 28A and 28B. The central light flux is transmitted through the polarizing prism 34 and is made incident upon the light source 21 by means of the condenser lens 22. In this embodiment, the light source 21 is formed by a semiconductor laser light source. The amount of light impinging upon the semiconductor laser device 21 varies in accordance with the information recorded in the disc 26 and thus, a voltage across the semiconductor laser device is also varied correspondingly due to a self coupled effect of the semiconductor laser device. Therefore, by detecting the variation of the voltage by means of a signal processing circuit 35, the information signal can be obtained.

Figure 10:
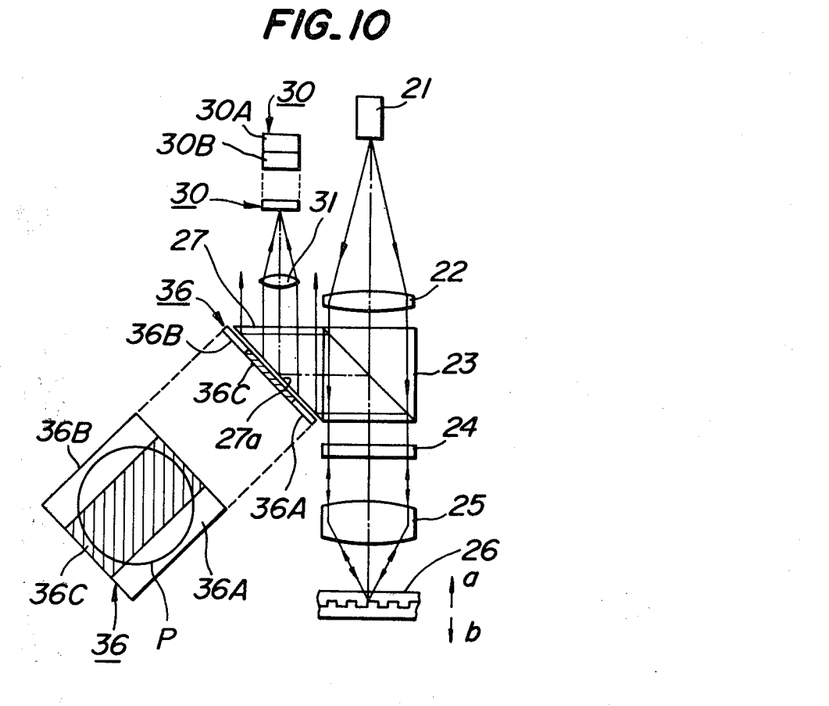

FIG. 10 is a schematic view illustrating still another embodiment of the focus detection apparatus according to the invention. In the present embodiment, a first light detector 36 is so arranged that its two separate light receiving regions 36A and 36B receive peripheral light fluxes refracted by a reflection surface 27a. Therefore, by detecting a difference between outputs of the light receiving regions 36A and 36B, it is possible to obtain the focussing error signal. At the same time the central light flux is reflected by a central portion of the reflection surface 27a and the reflected light flux is collected by the condenser lens 31 and then is made incident upon two light receiving regions 30A and 30B of a second light detector 30. Then the tracking error signal and the information signal can be obtained from the outputs of the light receiving regions 30A and 30B.

Figures 11A, 11B:
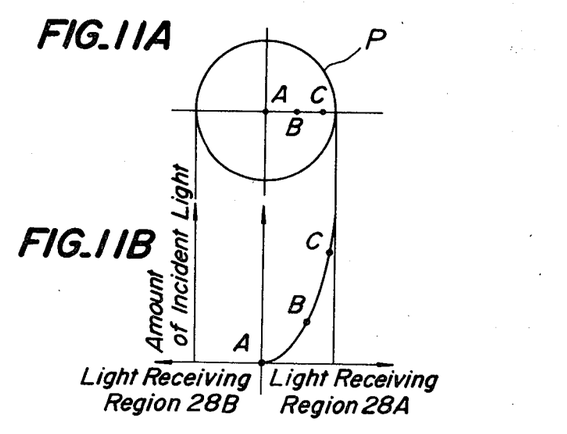
FIGS. 11A and 11B are diagrams for explaining the operation of the apparatus shown in FIG. 10.

FIGS. 11A and 11B are diagrams similar to those shown in FIGS. 5A and 5B for illustrating the variation in an amount of light impinging upon the light receiving regions 36A and 36B when the disc 26 deviates out of the in-focussed position. As apparent from FIG. 11B, the large variation is produced at points B and C which are remote from a point A on the optical axis. Since the first light detector 36 is arranged to receive the peripheral light flux showing the large variation, the focus error can be detected at the very high sensitivity. To this end, the first light detector 36 comprises a light shielding section 36C at its central portion.

Figure 12:
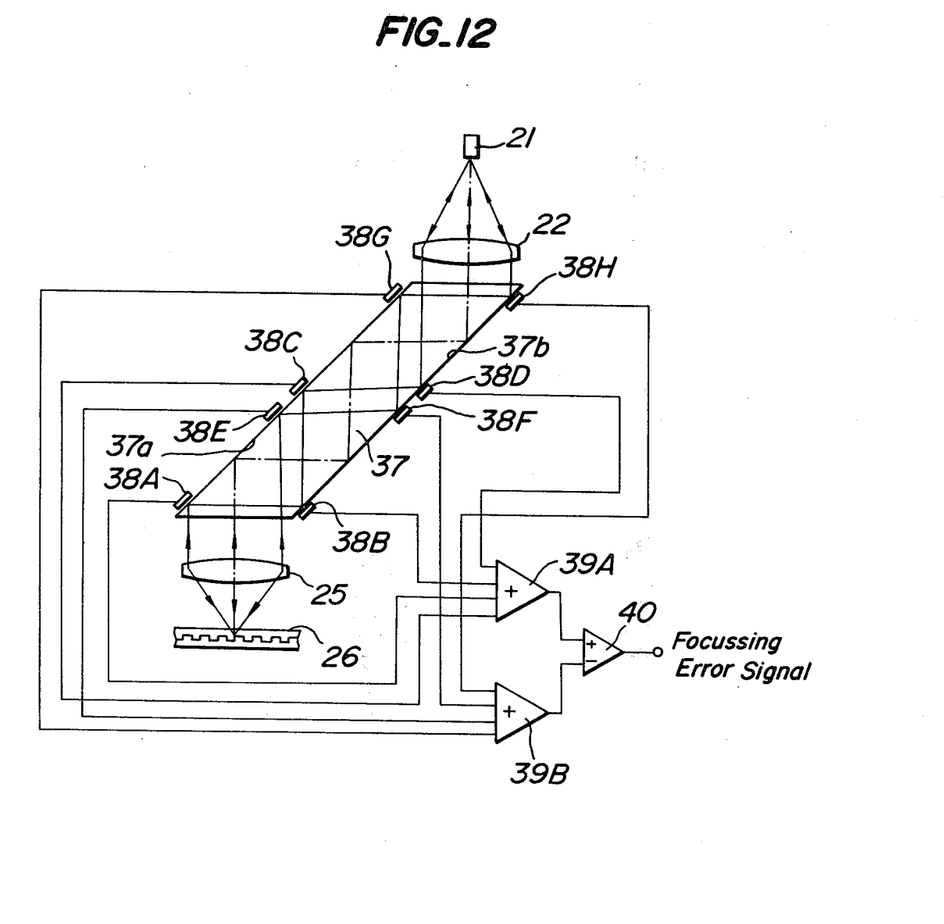

FIG. 12 shows still another embodiment of the focus detection apparatus according to the invention. In this embodiment, use is made of and elongated detection prism 37 having opposed reflection surfaces 37a and 37b set substantially at the critical angle. A laser beam emitted from a semiconductor laser light source 21 is converted by a collimator lens 22 into a parallel beam. The parallel beam is totally reflected in the detection prism 37 by a plurality of times and then is projected by an objective lens 25 onto a disc 26. The light reflected by the disc is collected by the objective lens 25 and is made incident upon the detection prism 37. The light is totally reflected by the reflection surfaces 37a and 37b by a plurality of times and then is made incident upon the semiconductor laser light source 21 by means of the collimator lens 22. A peripheral light flux reflected by the disc 26 is refracted by the reflection surface 37a and 37b and is received by a plurality of separate light receiving regions 38A to 38H. During the total reflection by several times in the detection prism 37, the amount of reflected light is not changed, but the amount of refracted light is increased exponentially. Therefore, when a first, sum of outputs from the regions 38A to 38D is generated by a first adder 39A and a second sum of outputs from the regions 38E to 38H is formed by a second adder and then a difference between these first and second sums is produced by a differential amplifier 40. Then the focussing error signal can be obtained from the differential amplifier 40 at an extremely high sensitivity.

Figure 13:
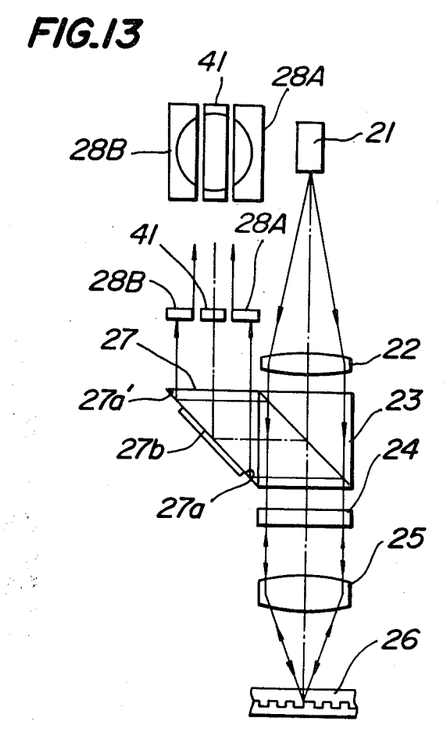

FIG. 13 illustrates still another embodiment of the focus detection apparatus according to the invention. In this embodiment, the detection prism comprises at peripheral portions two separate totally reflecting surfaces 27a and 27a' which are set substantially at the critical angle, and a reflection mirror 27b at a central portion. The two separate light receiving regions 28A and 28B of a first light detector are arranged to receive the peripheral light fluxes totally reflected by the reflection surfaces 27a and 27a', respectively. The central light flux reflected by the central mirror 27b is received by a second light detector 41 from which is obtained the information signal entirely free from the focussing error.

Figure 14A:
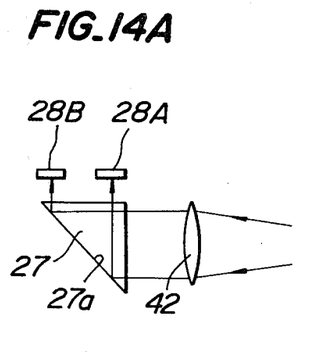
Figure 14B:
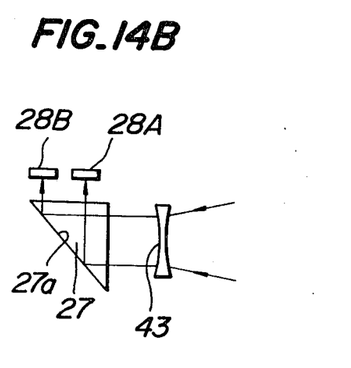

In the embodiments mentioned above, the parallel light flux is made incident upon the totally reflecting surface 27a in the in-focussed condition. According to the invention, a diverging or converging light flux may be made incident upon the reflection surface 27a even in the in-focussed condition. When the diverging light flux is made incident upon the reflection surface in the in-focussed condition, a convex lens 42 may be inserted between the beam splitting element 23 and the detection prism 27 as shown in FIG. 14A. When the converging light flux is made incident upon the reflection surface 27a, a concave lens 43 may be arranged in front of the detection prism 27 as illustrated in FIG. 14B. This concave lens 43 may be replaced by a complex lens of a partial convex and concave lens. In either embodiments, the diverging or converging light flux is converted into the parallel light flux and the converted parallel light flux is made incident upon the reflection surface 27a. Therefore, the focussing error signal may be obtained by the separate light receiving regions 28A and 28B which receive the peripheral light fluxes.

Figure 15:
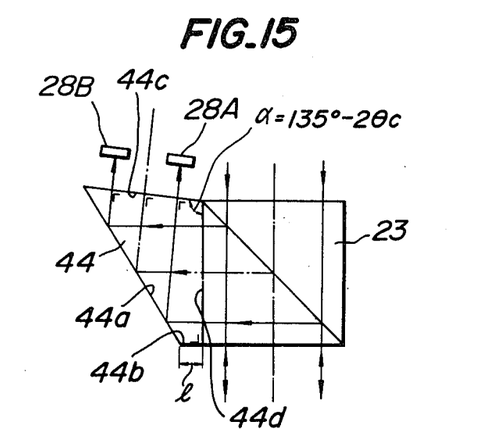

In the embodiments mentioned above, the detection prism has the refractive index $\sqrt{2}$ for the sake of simplicity, it may have any refractive index as long as the reflection surface is set at or near the critical angle. For instance, use may be made of material having a refractive index higher than $\sqrt{2}$. In such a case, in order to assure that the light flux reflected by the reflection surface set substantially at the critical angle can emanate from the detection prism through the same prism surface, an apex of the prism 44 is cut away as shown in FIG. 15 to form a surface 44b having a suitable dimension e. In FIG. 15, an exit surface 44c and an entrance surface 44d make an angle $\alpha$ equal to $135° - 2\theta c$ ($\theta c$ being a critical angle). Then the light flux reflected by the reflection surface 44a emanates from the exit surface 44c perpendicularly thereto. Such a construction makes it easy to adjust a position of the light detector.

Figures 16, 17:
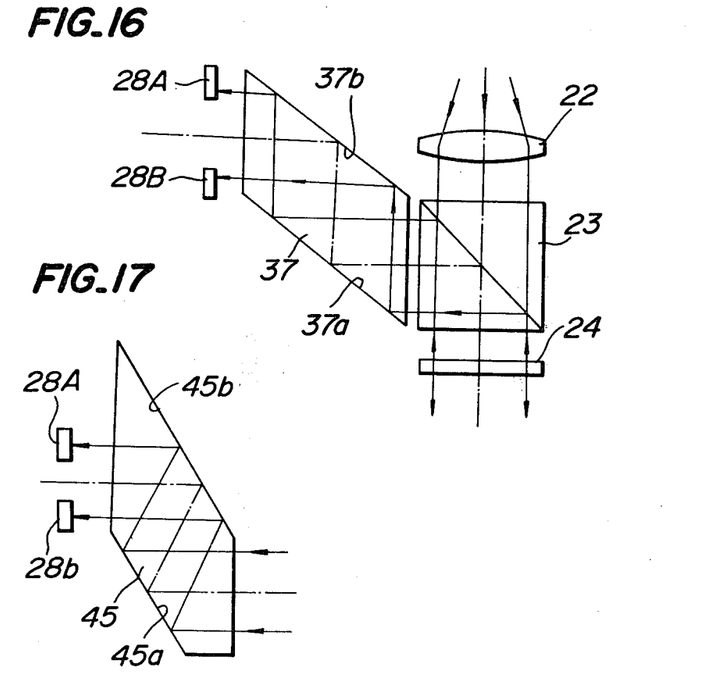

FIG. 16 is a modification of the embodiment shown in FIG. 12 in which the elongated detection prism 37 is used and the light is totally reflected within the prism by several times. In this modification, the light flux transmitted through the quarter-wavelength plate 24 is reflected by the polarizing prism 23 and then is made incident upon the detection prism 37 having parallel reflection surfaces 37a and 37b set substantially at the critical angle. The peripheral light fluxes totally reflected between the reflection surfaces 37a and 37b by several times are received by the separate light receiving regions 28A and 28B. By detecting the reflected light fluxes, the detection sensitivity can be further increased.

FIG. 17 shows another embodiment of the detection prism within which the light flux is totally reflected by several times. The detection prism 45 of this embodiment is made of material having a refractive index higher than $\sqrt{2}$ and has totally reflecting surfaces 45a and 45b which are set substantially at the critical angle. Also in this embodiment, the peripheral light fluxes reflected by the surfaces 45a and 45b are received by the two separate light receiving regions 28A and 28B.

Further, in the above embodiments, use is made of the polarized light, but according to the invention, nonpolarized light may be equally used. In the embodiment shown in FIG. 4, it is sufficient for the reflection surface 27a of the detection prism 27 to be arranged with respect to a single light ray among the light flux impinging upon the surface 27a at an angle equal to the critical angle or slightly smaller than the critical angle. Therefore, either diverging or converging light beam may be used, instead of the parallel light beam. Furthermore, the polarizing prism 23 may be replaced by a half mirror. Moreover, in the embodiment shown in FIG. 4, S-polarized light impinges upon the reflection surface 27a of the detection prism 27, but P-polarized light may impinge upon the reflection surface 27a by inserting a 90° rotary polarization element 20 as illustrated in FIG. 6. In such a case, the intensity of reflection light changes extremely abruptly near the critical angle as shown in FIG. 3 and thus, the sensitivity of the focussing error detection can be further increased. It should be further noted that the present invention is not limited to the application to the above mentioned optically reading apparatus for the video disc, but may be applied to the focus detection in various optical instruments. Moreover in the above embodiments the optical member is consisting of the detection prism having a suitable refractive index, but it may be constituted by any other element such as a plane glass plate.

What is claimed is:

1. A method for detecting a focussing error signal of an objective lens with respect to an object onto which a light spot is to be formed by means of said objective lens, comprising focussing light emitted from a light source onto the object whereby light flux is returned from said object;

introducing at least a part of the returned light flux from the object into an optical member including an optical surface which reflects and refracts light flux from said object that is incident thereon, said optical member being formed of a material that has a higher refractive index than the medium into which said incident light flux is either refracted or transmitted; and detecting variations in the distribution of either the reflected and refracted light flux at the periphery of said optical surface to produce a focussing error signal from the peripheral light flux.

2. A method according to claim 1, wherein said optical surface is so set that a given light ray in said part of the peripheral light flux is made incident upon the optical surface at an angle which is substantially equal to a critical angle when said objective lens is in an in-focussed condition.

3. A method according to claim 1, wherein said optical surface is so set that a given light ray in said part of the peripheral light flux is made incident upon the optical surface at an angle which is smaller than a critical angle when said objective lens is in an in-focussed condition.

4. A method according to claim 1, wherein said optical surface is so set that a given light ray in said part of the peripheral light flux is made incident upon the optical surface at an angle which is greater than a critical angle when said objective lens is in an in-focussed condition.

5. A method according to claim 1, wherein a peripheral light flux reflected by the optical surface and situated on one side of an optical axis, and peripheral light flux reflected by the optical surface and situated on the other side of said optical axis are separately detected.

6. A method according to claim 1, wherein a peripheral light flux reflected by the optical surface and situated on one side of an optical axis and a peripheral light flux refracted by and transmitted through the optical surface and situated on the other side of the optical axis are separately detected.

7. A method according to claim 1, wherein a peripheral light flux refracted by and transmitted through the optical surface and situated on one side of an optical axis, and a peripheral light flux refracted by and transmitted through the optical surface and situated on the other side of said optical axis are separately detected.

8. A method according to claim 1, wherein the peripheral light flux returned by the object impinges upon the optical surface as a parallel light flux in the in-focussed condition.

9. A method according to claim 1, wherein the light flux returned by the object impinges upon the optical surface as a diverging light flux in an in-focussed condition.

10. A method according to claim 1, wherein the light flux returned by the object impinges upon the optical surface as a converging light flux in an in-focussed condition.

11. A method according to claim 1, wherein the light flux impinging upon the optical surface is a P-polarized light flux.

12. A method according to claim 1, wherein the light flux returned by the object is reflected by the optical surface by a plurality of times.

13. A method according to claim 1, wherein only the peripheral light flux returned by the object is introduced into said optical surface.

14. An apparatus for detecting a focussing error signal of an objective lens with respect to an object onto which a light beam emitted from a light source is to be focussed as a light spot by means of said objective lens comprising a beam splitting element arranged between the light source and the objective lens for directing the light beam emitted from the light source to the objective lens and directing a light flux returned by the object along a path of travel that is angularly disposed from that of the light source, an optical member arranged to receive at least a part of the light flux returned from said object and including an optical surface which both reflects and refracts at least a part of said returned light flux, said optical member being made of material having a higher refractive index than that of the medium into which the incident light flux passes after it has been either refracted by or transmitted through said optical surface;

light detecting means having at least two light receiving regions arranged to receive at least a part of light flux after it has fallen upon said optical surface to produce output signals representing amounts of the peripheral light flux impinging upon the light receiving regions of said detecting means; and a circuit means for receiving the output signals from the light detecting means to form a difference signal as the focussing error signal.

15. An apparatus according to claim 14, wherein said optical member is consisting of a detection prism.

16. An apparatus according to claim 14, wherein said light receiving regions are so arranged to receive separately a light flux reflected by the optical surface situated on one side of an optical axis, and a light flux reflected by the optical surface situated on the other side of said optical axis, respectively.

17. An apparatus according to claim 14, wherein said light receiving regions are so arranged to receive separately a peripheral light flux refracted by and transmitted through the optical surface situated on one side of an optical axis, and a peripheral light flux refracted by and transmitted through the optical surface situated on the other side of said optical axis are separately detected.

18. An apparatus according to either one of claims 14 or 15, wherein said beam splitting element is constituted by a polarizing prism and a polarized light flux impinges upon the optical surface.

19. An apparatus according to claim 18, further comprising a quarter-wavelength plate arranged between the polarizing prism and the objective lens.

20. An apparatus according to claim 18, wherein the polarized light flux is a P-polarized light flux.

21. An apparatus according to claim 14, further comprising a collimator lens arranged between the light source and the objective lens and said light flux impinging upon the optical surface is a parallel light flux in an in-focussed condition of the objective lens.

22. An apparatus according to claim 14, wherein the optical member is so arranged that the optical surface makes with respect to a given light ray in incident light flux an angle which is substantially equal to a critical angle.

23. An apparatus according to claim 14, wherein the optical member is so arranged that the optical surface makes with respect to a given light ray in incident light flux an angle which is smaller than a critical angle.

24. An apparatus according to claim 14, wherein the optical member is so arranged that the optical surface makes with respect to a given light ray in incident light flux an angle which is greater than a critical angle.

25. An apparatus according to claim 19, wherein the optical member is arranged between the polarizing prism and the light detecting means to receive at least a part of the light flux reflected by the polarizing prism, and the light emitted from the light source is transmitted through the polarizing prism.

26. An apparatus according to claim 15, wherein the detection prism is a rectangular shape having such a length that the light flux is reflected by opposed optical surfaces by a plurality of times.

27. An apparatus according to claim 25, further comprising a collimator lens arranged between the polarizing prism and the objective lens for introducing a parallel light beam into the objective lens and a concave lens arranged between the polarizing prism and the optical member for converting the incident converging light beam into a parallel light beam.

28. An apparatus according to claim 25, further comprising a convex lens arranged between the light source and the polarizing prism for introducing the converging light beam into the objective lens, and a concave lens arranged between the polarizing prism and the detection prism for converting the converging incident light beam into a parallel light beam.

29. An apparatus according to claim 25, wherein said polarizing prism comprises two separate polarizing films situated at peripheral portions opposed to each other with respect to an optical axis so as to reflect only the peripheral light fluxes toward the optical member.

30. An apparatus according to claim 25, wherein said optical member comprises a triangular prism having two totally reflecting surfaces situated at peripheral portions opposed to each other with respect to an optical axis and a reflection mirror situated at a central portion.

31. An apparatus according to claim 14, wherein said object is an optical disc having information tracks recorded concentrically or spirally and the apparatus further comprises a condenser lens for collecting a central light flux reflected by said optical surface and a second light detector arranged at a focal plane of the condenser lens and having two light receiving regions divided along a boundary plane including an optical axis and extending in a direction tangential to the information track of the optical disc, whereby a tracking error signal is derived from outputs of said two light receiving regions of the second light detector.

32. An apparatus according to claim 14, wherein said object is an optical disc having information tracks recorded concentrically or spirally and said light source is formed by a semiconductor laser device, whereby a central light flux which is reflected by said optical disc and does not impinge upon said light detecting means is made incident upon said semiconductor laser device and an information signal is derived from the semiconductor laser device on the basis of a self coupled effect of the semiconductor laser device.

33. A method for detecting a focussing error signal indicating whether proper focal distance is achieved between an objective lens and an object onto which a light beam is projected, comprising the steps of:
focussing a light beam onto an object through an objective lens to achieve a desired concentration of light;
passing the light which is returned by the object through a beam splitting means whereby entering light is redirected along a new path of travel;
diverting light redirected by said splitting means into a reflecting means having at least one surface means for passing redirected light incident thereon from a first medium having a higher refractive index into a second medium having a lower refractive index;
positioning said at least one surface means so that light returned from the object can strike said surface means at a critical angle and said at least one surface means comprising means forming first, second and third portions such that light travelling parallel to the optical axis of the objective lens is substantially reflected and light diverging from said optical axis of the objective lens is substantially reflected by said first portion means of said surface means and substantially transmitted through said second portion means of said surface means and light converging relative to said optical axis is substantially reflected by said second portion means and substantially transmitted through said first portion means, wherein the light which has passed through the objective lens on the optical axis of the objective lens is reflected by said third portion means, and said third portion means is positioned between said first portion means and said second portion means;
detecting at least a portion of the light incident upon said first and second portion means utilizing first and second detecting means;
processing the information derived from said detecting means;
whereby the focusing condition of the objective lens is determined by analyzing the extent to which light rays transmitted through the objective lens are either diverging or converging relative to the optical axis of the objective lens based upon the contrast in the amount of light individually received by each of said first and second detecting means.

34. The method of claim 33, wherein said third portion means is at least as large as said first and second portion means and light striking said third portion means is not detected by said first and second detecting means.

35. The method of claim 33 or 34, wherein said first and second detecting means detect light transmitted through said first and second portion means respectively.

36. The method of claim 33 or 34, wherein said first and second detecting means detect light reflected by said first and second portion means respectively.

37. The method of claim 33 or 34, wherein said first and second detecting means receive light only from peripheral portions of the light beam.

38. The method of claim 33 or 34, wherein there are a plurality of said surface means inclined at the critical angle and a plurality of said first, second, and third portion means.

39. The method of claim 35, wherein there are a plurality of said first and second detecting means.

40. A detection device for detecting a focussing condition with respect to an object upon which a light beam is focussed and returned from the object, said reflecting means comprising at least one surface means positioned to receive returned light at a critical angle, said at least one surface means comprising means forming first and second portions, said at least one surface means being positioned such that light travelling parallel to the optical axis of said focussing means is substantially reflected by both said first and second portion means and light diverging relative to said optical axis of said focussing means is substantially reflected by said first portion means and substantially transmitted through said second portion means and light converging relative to said optical axis of said focussing means is substantially reflected by said second portion means and substantially transmitted through said first portion means;

first and second detecting means for detecting light incident upon said first and second portion means respectively; said first and second detecting means being positioned so as to receive only peripheral portions of the light beam;

whereby the focussing condition of said focussing means is determined by analyzing reception of light by said first and second detecting means to determine the direction of the light relative to the optical axis of the objective lens.

41. The detection device of claim 40 further including means for processing the outputs from said first and second detecting means.

42. The detection device of claim 41, wherein said processing means comprises a differential amplifier.

43. The detection device of claim 40, wherein said at least one surface means comprises third portion means positioned between said first portion means and said second portion means such that light passing along the optical axis of said focussing means illuminates said third portion means and light which illuminates said third portion means is not received by said first and second detecting means, said reflecting means further including a beam splitter means which diverts light from said focussing means onto said at least one surface means.

44. The detection device of claim 43, wherein said third portion means is at least as large as said first or second portion means.

45. The detection device of claim 40 or 43, wherein there are a plurality of said at least one surface means, a plurality of first portion means and a plurality of second portion means.

46. The detection device of claim 40, 43 or 44, wherein said first and second detecting means receive light reflected from said first and second portion means respectively.

47. The detection device of claim 40, 43 or 44, wherein said first and second detecting means receive light transmitted through said first and second portion means respectively.

48. The detection device of claim 40, wherein said reflecting means comprises at least one means forming a prism.

49. The detection device of claim 47, wherein one of said at least one prism means polarizes light.

50. The detection device of claim 43, further comprising third detecting means for detecting the intensity of light whereby light illuminating said third portion means is at least partly received by said third detecting means.

51. The detection device of claim 50, wherein said third detecting means is positioned such that a light ray passing through the optical axis of said focussing means illuminates a point central of said third detecting means, said third detecting means comprising first and second sections located such that each is located on the opposite side of the central point of said third detecting means, said first and second portion means also being arranged in opposing fashion relative to the central point illuminated by a light ray passing through said optical axis and further arranged so that the opposing relationship between said first and second sections is orthogonal to the opposing relationship between said first and second portion means whereby intensities of light spaced from the optical axis may be detected in four different orthogonal directions normal to a light ray passing through said optical axis.

52. The detection device of claim 50, whereby lens means for condensing light is positioned between said third portion means and said third detecting means.

53. The detection device of claim 43, wherein the light illuminating said third portion means is not reflected by said reflecting means and is received by semiconductor means for detecting a variation of light intensity.

54. The detection device of claim 53, wherein said semiconductor means also is the source which emits the light beam onto the object.

55. The detection device of claim 43, wherein said first and second detecting means receive light transmitted through said first and second portion means and said third portion means reflects light onto a third means for detecting light.

56. The detection device of claim 55, wherein there are a plurality of said first, second, and third portion means and a plurality of said first and second detecting means.

57. The detection device of claim 43 or 44, wherein said third portion means comprises mirror means for reflecting all light illuminating said third portion means.

58. The apparatus of claim 14, further including lens means for refracting light flux transmitted therethrough into parallel light flux, said lens means being positioned between said beam splitting element and said optical member.

* * * * *